United States Patent [19]

Hartmann et al.

[11] Patent Number: 5,077,501

[45] Date of Patent: Dec. 31, 1991

[54] CIRCUITRY FOR CORRECTING GEOMETRICAL DISTORTIONS

[75] Inventors: Uwe Hartmann, Villingen-Schwenningen; Franz Dieterle, St. Georgen; Fritz Ohnemus, Villingen-Schwenningen, all of Fed. Rep. of Germany

[73] Assignee: Deutsche Thomson-Brandt GmbH, Villingen-Schwenningen, Fed. Rep. of Germany

[21] Appl. No.: 235,652

[22] Filed: Aug. 24, 1988

[30] Foreign Application Priority Data

Sep. 4, 1987 [DE] Fed. Rep. of Germany ....... 3729676

[51] Int. Cl.$^5$ ............................................. H01J 29/56
[52] U.S. Cl. .................................................... 315/371
[58] Field of Search ............................. 315/371, 400

[56] References Cited

U.S. PATENT DOCUMENTS 4,704,564 11/1987 Ito et al. .............................. 315/400

Primary Examiner—Theodore M. Blum
Attorney, Agent, or Firm—Max Fogiel

[57] ABSTRACT

A circuit for correcting geometrical distortions in reproducing signals on a screen of a cathode-ray tube in a display monitor. A line-frequency correction current having line deflection frequency is coupled into the vertical deflection unit which serves for deflecting vertically electron beams in the cathode-ray tube. A circuit which provides horizontal deflection current is connected to the primary winding of a differential transformer. The differential transformer has a secondary winding connected to the circuit which supplies vertical deflection current. The distortion is reflected by a cathode-ray tube which has a substantially flat picture screen, in which horizontal lines to be displayed form in angle with a horizontal reference grid.

7 Claims, 1 Drawing Sheet

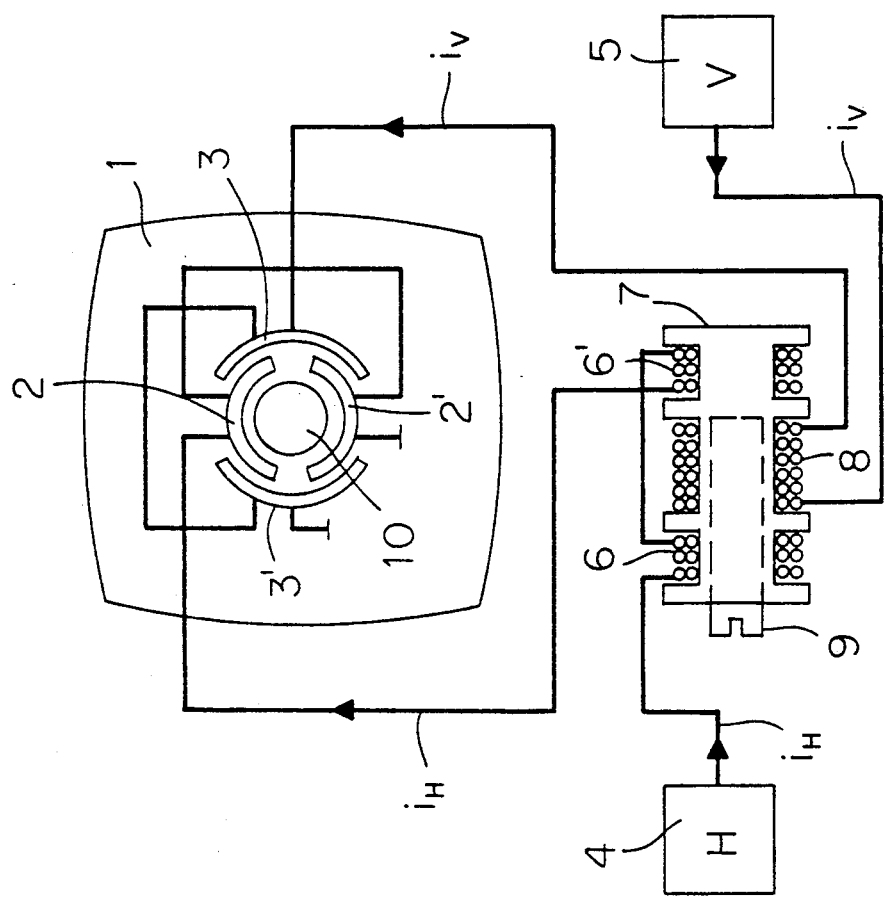

CIRCUITRY FOR CORRECTING GEOMETRICAL DISTORTIONS

BACKGROUND OF THE INVENTION

The invention concerns circuitry for correcting geometrical distortions while reproducing signals on the screen of a cathode-ray tube in a display monitor with a device for coupling a line-frequency correction current into the switching circuit that deflects the electron beams vertically.

Since the color tubes in display monitor are now being provided while they are being manufactured with means of deflecting the electron beams, the deflection unit must be very precisely adjusted in relation to the picture tube during assembly. The optimal position of the deflection unit at the neck of the tube must be adapted to color purity, pixel focus, and convergence. Since the beam system in a color tube has unavoidable tolerances, the optimal position of the deflection unit can only be a compromise between the requisite adjustments. Many tube units accordingly have one of these inherent errors, characterized in that the horizontal lines are at a slight angle to the horizontal reference grid, meaning that the horizontal are skewed around points on the vertical midline of the picture, so that the exhibit a slight tendency to rise and fall. An angular error of this type is especially apparent when characters are being displayed.

Circuits that eliminate geometrical distortions in the form of pillow distortions on the screen are known. A line-frequency correction current is coupled into the vertical-deflection circuit in this process. To correct this specific type of distortion, the line-frequency current must first be converted into a parabolic shape, which is expensive (German App. 1 916 104).

SUMMARY OF THE INVENTION

The present invention is devoted strictly to the elimination of the aforesaid error and its object is accordingly to eliminate by means that are as simple as possible the error of skewed horizontal lines. This object is attained by the invention recited in the claim.

One embodiment of the invention will now be described with reference to the drawing.

BRIEF DESCRIPTION OF THE DRAWING

An electrical schematic showing the essential components according to the present invention.

DESCRIPTION OF THE PREFERRED EMBODIMENTS

At the neck 10 of a picture tube 1 is a unit that deflects electron beams. It consist of horizontal-deflection coils 2 and 2' and of vertical-deflection coils 3 and 3'. The coils are supplied with current $i_h$ from a horizontal end stage 4 and with current $i_v$ from a vertical end stage 5. Positioned in the circuit for the horizontal deflection current is the primary winding 6 and 6' of a differential transformer 7. The secondary winding 8 of differential transformer 7 is looped into the vertical-deflection circuit. A ferrite core 9 can be employed in a way that is in itself known to vary the coupled-in current asymmetrically in such a way as to detect asymmetrical errors as well.

A sawtooth line-frequency current is coupled into the vertical-deflection circuit to generate opposite correction currents at the beginning and end of the line, producing a desired rotation. Since the system is very small and since both the horizontal and vertical currents flow directly through it, it can be positioned in the immediate vicinity of the deflection unit and optionally integrated into it.

What is claimed is:

1. A circuit for correcting geometrical distortions in reproducing signals on a screen of a cathode-ray tube in a display monitor comprising: vertical deflection means for deflecting vertically electron beams in said cathode-ray tube; means for coupling a line-frequency correction current having line deflection frequency into said vertical deflection means; said coupling means comprising a differential transformer having a primary winding and a secondary winding; means emitting horizontal deflection current and connected to said primary winding; and means emitting vertical deflection current and connected to said secondary winding.

2. A circuit as defined in claim 1, wherein said cathode-ray tube has a substantially flat picture screen.

3. A circuit as defined in claim 1, wherein horizontal lines to be displayed form an angle with a horizontal reference grid.

4. A circuit as defined in claim 1, wherein tolerances between said cathode-ray tube and said deflection means result in said geometrical distortions.

5. A circuit as defined in claim 1, wherein said coupling means is located in close proximity to said vertical deflection means and forming an integrated circuit with said vertical deflection means.

6. A circuit for correcting geometrical distortions in reproducing signals on a screen of a cathode-ray tube in a display monitor comprising: vertical deflection means for deflecting vertically electron beams in said cathode-ray tube; means for coupling a saw-tooth line-frequency correction current having line deflection frequency into said vertical deflection means; said coupling means comprising a differential transformer having a primary winding and a secondary winding; means emitting horizontal deflection current and connected to said primary winding; and means emitting vertical deflection current and connected to said secondary winding; said cathode-ray tube having a substantially flat picture screen; horizontal lines to be displayed forming an angle with a horizontal reference grid; tolerances between said cathode-ray tube and said deflection means resulting in said geometrical distortions; said coupling means being located in close proximity to said vertical deflection means and forming an integrated circuit with said vertical deflection means.

7. A circuit for correcting geometrical distortions in reproducing signals on a screen of a cathode-ray tube in a display monitor comprising: vertical deflection means for deflecting vertically electron beams in said cathode-ray tube; means for coupling a saw-tooth line-frequency correction current having line deflection frequency into said vertical deflection means; said coupling means comprising a differential transformer having a primary winding and a secondary winding; means emitting horizontal deflection current and connected to said primary winding; and means emitting vertical deflection current and connected to said secondary winding; said cathode-ray tube having a substantially flat picture screen; horizontal lines to be displayed forming an angle with a horizontal reference grid.

* * * * *